United States Patent

Shurtz, II et al.

[11] Patent Number: 5,844,735
[45] Date of Patent: Dec. 1, 1998

[54] FABRY-PEROT INFRARED MULTIWAVELENGTH OPTICAL FILTER

[75] Inventors: Richard R. Shurtz, II, Oakton, Va.; Edward J. Sharp, Fort Washington, Md.

[73] Assignee: The United States of America as represented by the Secretary of the Army, Washington, D.C.

[21] Appl. No.: 520,268

[22] Filed: Jul. 29, 1983

[51] Int. Cl.$^6$ .................................................. G02F 1/16
[52] U.S. Cl. ........................ 359/885; 359/589; 359/601
[58] Field of Search ................. 350/1.6, 1.7, 162, 350/163, 168, 316, 317, 320; 356/349, 352; 332/7.51; 372/99; 359/589, 601, 885

[56] References Cited

U.S. PATENT DOCUMENTS

| | | | |
|---|---|---|---|
| 3,358,243 | 12/1967 | Collins et al. | 356/352 |
| 3,672,746 | 6/1972 | Miller | 350/359 |
| 3,699,347 | 10/1972 | Buchan et al. | 350/356 |
| 3,930,718 | 1/1976 | Jensen | 350/356 |
| 4,204,771 | 5/1980 | Shull | 356/352 |
| 4,448,486 | 5/1984 | Evans | 356/352 |

OTHER PUBLICATIONS

Grischwansky et al, "Double–Fabry–Perot Filter" Jan. 1972, p. 2500, IBM tech. Disc Bull., vol. 14, #8.

Gustafsson et al, Wavelength Scanning . . . , Nov. 1979, pp. 1100–1102, J. Phys. B: Sci Instr., vol. 12, #11.

Frolich et al, "Tuning Properties . . . Fabry–Perot et al", Mar. 1976, pp. 205–207, Appl. Physi., vol. 9, #3.

*Primary Examiner*—Nelson Moskowitz
*Attorney, Agent, or Firm*—Nathan Edelberg; Milton W. Lee; Aubrey J. Dunn

[57] ABSTRACT

An optical material having an index of refraction dependent on wavelength of incident radiation is used between the reflectors of an off-normal Fabry-Perot cavity used as an interference filter. External to the cavity, and in the direction of incident radiation, another optical material having an index of refraction dependent on wavelength of radiation is placed. The incident radiation is thus refracted into and within the cavity dependent on its wavelength. By proper choice of the indices of refraction, and other variables, the filter may be designed to exactly match the output spectrum of a line spectrum laser, and to transmit all spectral lines of the laser, but to reflect all other radiation of interest.

2 Claims, 1 Drawing Sheet

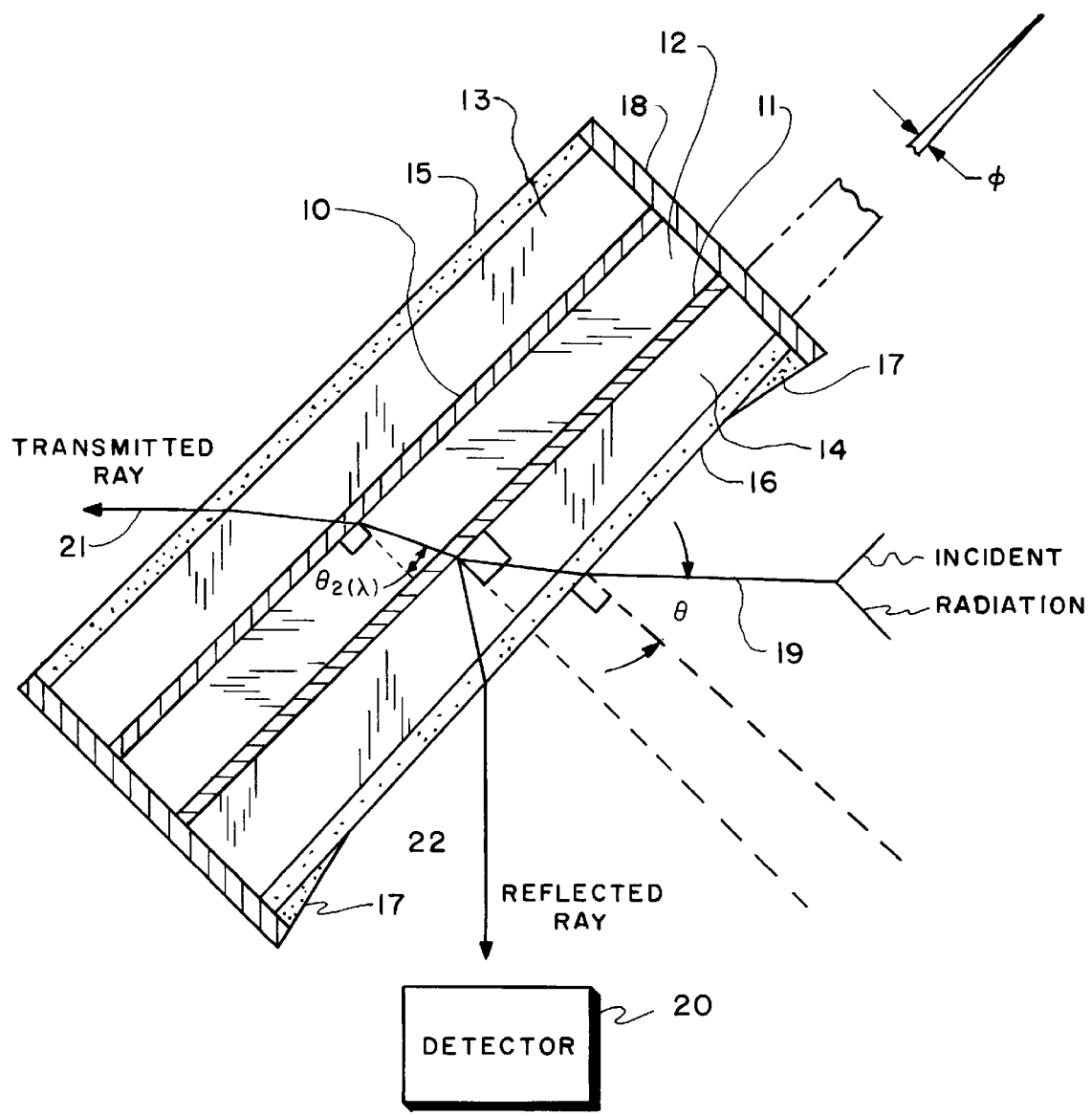

FABRY-PEROT INFRARED MULTIWAVELENGTH OPTICAL FILTER

The invention described herein may be manufactured, used and licensed by the U.S. Government for governmental purposes without the payment of any royalties thereon.

BACKGROUND OF THE INVENTION

This invention is in the field of protectors for optical photodetectors. These detectors include various quantum and thermal detectors, and the human eye; the protectors prevent damage to the detectors by high-intensity optical radiation. There are many well-known devices, including mechanical, electro-optical, and filter types for providing detector protection. Mechanical types include shutters and beam deflectors; electro-optical types include such things as Kerr cells; filters may be active (photosensitive materials) or passive (interference or neutral density). An ideal protector must fulfill various requirements: it must not degrade or attenuate desired radiation, it must provide complete blocking of undesired radiation above some predetermined threshold, it must have a wide enough optical bandwidth to cover the spectrum of the undesired radiation, and (in many cases) it must be fast acting. Unfortunately, some of these requirements may be mutually contradictory. For example, the radiation of interest may at such a low level with respect to the undesired radiation that a protector may block both radiations. Lately there has been considerable interest in protecting military infrared detectors against such counter-measures as high-power infrared lasers. The output spectra of such lasers are chosen to fall within the response bands of such infrared detectors and may momentarily or permanently "blind" them. Various techniques have been proposed as counter-counter-measures to such lasers; one technique used a stacked array of Fabry-Perot interference filters, one for each spectral line of a laser; another technique uses such filters interchangeably, when laser illumination appears. With a laser such as a $CO_2$ type, which has hundreds of spectral lines, either of these techniques is unacceptable.

One might think that these lines would be harmonically related such that a single Fabry-Perot filter would respond to all of them from a given laser; unfortunately, that is not the case—the response peaks of known Fabry-Perot filters vary from the spectral lines of a $CO_2$ laser except for some predetermined central line. The present invention overcomes this problem.

SUMMARY OF THE INVENTION

This invention is a dispersive Fabry-Perot interference filter capable of passing multiple wavelengths from a laser, and of reflecting desired radiation, in order to protect a sensitive detector operating within a bandwidth including the laser wavelengths. The invention is an improvement over FIG. 1 of our previously filed United States patent application having Ser. No. 492,063, filed Apr. 28, 1983, and bearing the same title as this invention. As does said FIG. 1, this invention includes a Fabry-Perot optical cavity defined by two partially reflecting and parallel mirrors, spaced apart a distance dependent on, among other things, the wavelength of a counter-measure laser. Between the mirrors is a dispersive transparent material. This invention varies from that FIG. 1 of our other invention in that a wedge of dispersive optical material is placed external to the mirrors, toward the incident radiation. The effect of the two dispersive materials is to refract the various spectral lines of the laser such that the paths taken by the rays of various lines between the mirrors are one-half wavelength of the respective lines. Thus, each spectral line of the laser is passed (transmitted) by the filter, and other wavelengths are reflected to a detector. The use of two dispersive materials allows more accurate matching of the filter response to the laser than is the case with a single material.

BRIEF DESCRIPTION OF THE DRAWING

The single drawing FIGURE is a schematic showing, partly in section, of the invention.

DESCRIPTION OF PREFERRED EMBODIMENT

The invention may be best understood when this description is taken in conjunction with the drawing. In the drawing, which is not drawn to scale, we see partially reflecting and plane parallel mirrors 10 and 11 on either side of dispersive optical material 12; the outsides of the mirrors are covered by layers of dispersive optical material 13 and 14 with respective antireflection layers 15 and 16 on layers 13 and 14. Vignetting layers or wedges 17 are on layer 16. All of 10–17 are bound together by end caps 18. It should be understood that the thicknesses of some of the various layers are exaggerated for illustration purposes; layers 10, 11, 15, 16, and wedges 17 are actually very thin with respect to material layers 12, 13, and 14. Materials 12, 13, and 14 have indices of refraction n dependent on wavelength; they may have the same n, or the n of 12 may be different from that of 13 and 14. In any event, the optical parameters of the filter are related as follows.

$$2n_{2(\lambda)}\, d\, \cos\theta_{2(\lambda)} = m\lambda$$

wherein $n_{2(\lambda)}$ is the index of refraction of 13 and 14, d is the distance between 10 and 11, $\theta_{2(\lambda)}$ is the angle between a particular ray and the normal to mirror 10, m is the order number of the filter determined by the effective optical path length between mirrors 10 and 11, and $\lambda$ is wavelength of radiation.

Incident radiation, one ray of which is shown at 19, falls on layer 16 at angle $\theta$ to the normal of 16, is refracted in 14 dependent on $\lambda$, and is refracted in 12 also dependent on $\lambda$. For particular $\lambda$'s against which one wishes to protect detector 20, the ray(s) continues through material 13 and exits as transmitted ray 21. For $\lambda$'s not threatening to detector 20, reflection occurs at mirror 11, and the ray emerges as ray 22. The inventive filter acts as an optical comb filter to the threatening laser illumination, i.e., the narrow band laser wavelengths are transmitted, and the remainder of incident radiation is reflected to detector 20. For particular charts of filter response, one may refer to our previously filed invention mentioned above.

From the above, it can be seen that the filter as now set forth allows one to custom taylor the filter response to a particular expected threatening laser. One may choose a particular $n_{1(\lambda)}$ for material 12, $n_{2(\lambda)}$ for materials 13 and 14, and a particular wedge angle $\phi$, and incident angle $\theta$. Obviously $\phi$ may be zero, and $\theta$ may approach zero. If $\phi$ is unequal to zero, 14 will introduce a change in optical path length for different $\lambda$'s, resulting in dispersion of angle $\theta_2$.

We claim:

1. An off-normal dispersive Fabry-Perot multi-wavelength optical filter for separating line spectra from incident radiation including said line spectra and other radiation, said filter including:

a pair of plane, parallel, partially-reflecting mirrors;

means including a dispersive, transparent optical material for directing said incident radiation onto one of said mirrors at an off-normal angle dependent on wavelength and;

means consisting of a dispersive, transparent optical material for directing said incident radiation between said mirrors at an off-normal angle dependent on wavelength, whereby said line spectra is transmitted by said filter, and said other radiation is reflected thereby.

2. The filter as set forth in claim 1 wherein the two means have different indices of refraction.

* * * * *